March 10, 1953 — P. W. PHILLIPSON — 2,630,647
REEL SEAT
Filed May 19, 1947

INVENTOR:
PHILIP W. PHILLIPSON
BY Homer S. Sweet
ATTORNEY

Patented Mar. 10, 1953

2,630,647

UNITED STATES PATENT OFFICE 2,630,647

REEL SEAT

Philip W. Phillipson, Denver, Colo.

Application May 19, 1947, Serial No. 748,988

1 Claim. (Cl. 43—22)

This invention relates to fishing rods, and more particularly to fishing rods of fly-casting type furnished with a reel seat member constituting the rod butt termination, and has as an object to provide an improved such reel seat member susceptible of convenient association with and as the butt termination of fishing rods of various specific types and constructions.

A further object of the invention is to provide an improved construction and combination of elements constituting a reel seat member for butt-mounted association with fishing rods.

A further object of the invention is to provide an improved fishing rod reel seat member comprised in large part from synthetic resin or plastic material moldable into finished form.

A further object of the invention is to provide an improved fishing rod reel seat comprised from but few elements of simple, inexpensive manufacture susceptible of facile, inexpensive assembly in positions of ultimate use on rods of diverse specific constructions.

A further object of the invention is to provide an improved fishing rod reel seat of attractive appearance, high operative utility, wide adaptability, long practical life, and conveniently simple manipulation.

With the foregoing and other objects in view, my invention consists in the construction, arrangement, and combination of elements hereinafter set forth, pointed out in my claim, and illustrated by the accompanying drawing, in which—

Figure 1:
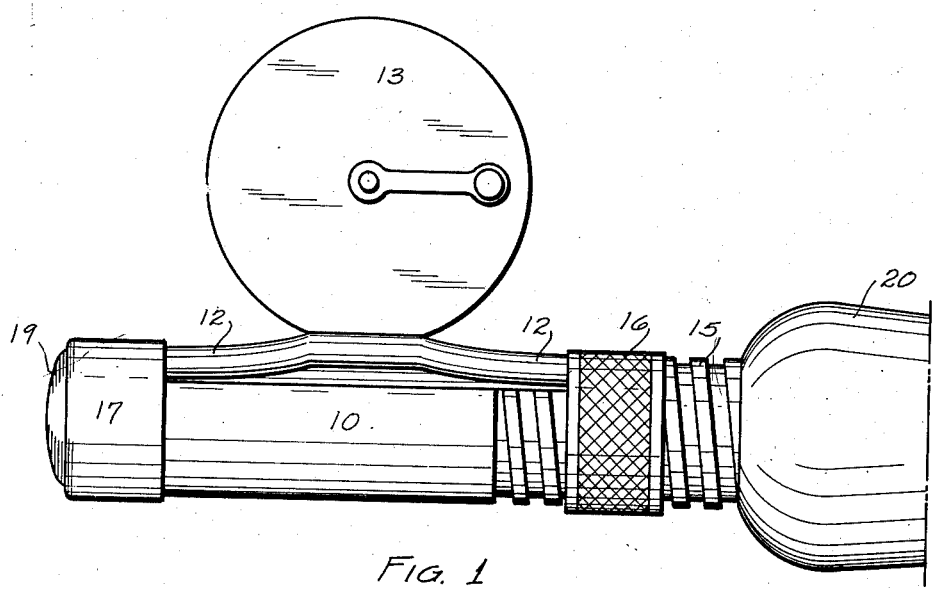
Figure 2:
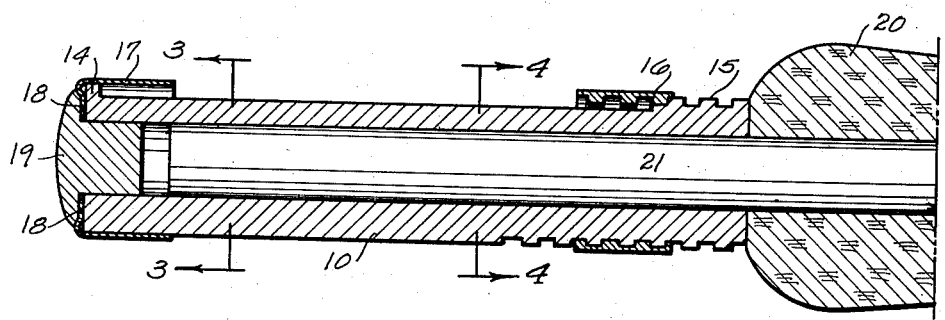
Figure 3:
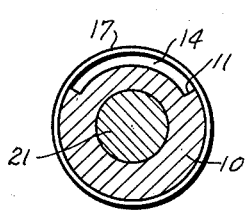
Figure 4:
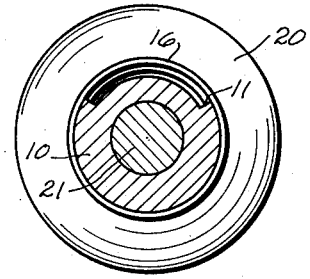

Figure 1 is a side elevation of a typical fishing rod butt furnished with a preferred embodiment of the invention carrying a conventional fishing reel in position for use. Figure 2 is a cross section taken axially of and longitudinally through the assembly according to Figure 1 with the reel omitted. Figure 3 is a cross section taken on the indicated line 3—3 of Figure 2. Figure 4 is a cross section taken on the indicated line 4—4 of Figure 2.

Jointed-type fishing rods commonly in use generally include, in a variety of specific constructions, a handle section characterized by a hand grip and a juxtaposed reel seat on and in fixed relation with a substantially cylindrical, relatively stiff rod length. In rod constructions adapted for the casting of "baits," as distinguished from "flies," it is customary to locate the hand grip on and to function as the butt end of the handle section with the reel seat adjacent and just forwardly thereof in the direction of rod length, while rod constructions designed for fly-casting use are normally characterized by a reversed grip and reel seat relative disposition such as presents the latter as the rod butt termination, and the improvements of the instant invention, though applicable to either type of rod, are of particular advantage and merit when butt-mounted on and to complete a rod of fly-casting type.

As exemplified by the drawing, the elements of the improved reel seat cooperate and are associated with a generally cylindrical, major element 10 to form a unitary assembly. The element 10 is formed from any suitable hard, rigid material of requisite strength and non-corrosive properties, it being convenient and desirable from the viewpoint of economy and practicability that said element be molded from synthetic resins or analogous so-called plastic materials through well-known methods and techniques effective to produce the unit in finished form for the elimination of subsequent machining or other processes. The element 10 is formed to the desired dimensions and proportions as a right cylinder modified as hereinafter specified and longitudinally traversed by a straight, cylindrical bore. Extending longitudinally of and interrupting the exterior surface of the element 10, a relatively-wide, shallow groove or channel 11 is provided for the reception and seated accommodation of the usual base plate 12 characteristic of conventional reel assemblies 13, said groove or channel 11 having a length somewhat in excess of the base plate 12 receivable therein and terminating at one end in an arcuate rib or segment 14, and terminating at its other end in a relatively more remote spacing from the corresponding element end to leave a cylindrical terminal portion on said element uninterrupted by said groove. At its end remote from the rib or segment 14, the element 10 is exteriorly threaded, as at 15, for a considerable distance. The threads along the element extend well past and are interrupted by the corresponding end of the groove or channel 11, and an internally-threaded, annular sleeve 16 cooperatively engages with the threaded portion 15 of the element 10 for selective adjustment axially along said element thread portion into and out of overlapping relation with the adjacent groove or channel end when the sleeve 16 is rotated on said element. When the element 10 is formed by molding from the preferred materials above specified, it is entirely feasible to form and complete the threads of its end portion 15 as an incident of the molding operation and without necessity for machining or subsequent working thereof; it being desirable that the element 10 and sleeve 16 threads be relatively coarse, deep, and generally rectangular in section for nonbinding, freely-adjustable cooperation to the desired ends. As will be readily apparent, the depth of the threads on the element 10 should be somewhat less radially of the element than the depth of the groove or channel 11 so as to leave a clearance between the inner margins of the sleeve 16 threads and the base of the groove or channel end covered by said sleeve at times, within which clearance the thickness of the reel base 12 may be accommodated and retained when the sleeve is rotated in a direction to engage over the groove or channel seat base.

The end of the element 10 provided with the rib or segment 14 is the outer or free end of the assembly, and a tubular ferrule 17, conveniently of metal, is telescoped over and in closely fitting engagement about this end of the element in an axial length sufficient to overlie the adjacent end of the groove or channel 11 for the provision of a pocket, end-limited by the rib or segment 14, wherein the end of the reel base 12 remote from the sleeve 16 may be slidably engaged and retained. On its outer end the ferrule 17 is formed with an annular, inwardly-directed, integral flange 18 having a central aperture registrable with the axial bore of the element 10 and a somewhat dished or concave outer face covering the end of said element. The ferrule 17 is secured in place on the element 10 and the reel seat assembly is completed by means of a headed plug 19, preferably of material the same as that from which said element is comprised, whereof the stem is slidably engaged and adhesively secured within the element bore and the head inner face bears against the concave or dished outer face of the ferrule 17. The outer or exterior face of the plug 19 head is advantageously smoothly convex to eliminate angles, ridges, or shoulders and to marginally merge with the head inner face in a thin circular line receivable within and to close smoothly against the concavity of the ferrule flange 18, thereby effectively sealing the plug head to the ferrule in a manner that largely inhibits penetration of moisture or dirt therebetween.

When a fishing rod handle section is to be equipped with the improved reel seat, the usual hand grip 20 is telescoped over and slipped along a rod length 21 to expose a butt end extension of said rod length beyond the hand grip somewhat shorter than the axial dimension of the element 10. The grip 20 having been adhesively or otherwise fixed to and in the desired position longitudinally of the rod length 21, suitable adhesive is applied to the surface of the rod length extension and, if expedient, to the walls of the element 10 bore, whereafter said element, carrying the sleeve 16 but not the ferrule 17 and plug 19, is telescoped over the rod length extension to abutment of its threaded end against the butt-directed end of the grip 20 and is then rotated to bring its groove or channel 11 into desired alinement with the grip contours and line guides of the assembly. When and as associated with the grip 20 and rod length 21 in the manner shown and above set forth, the element 10 projects beyond the end of the rod length 21 to leave an unobstructed portion of the element bore sufficient for the accommodation of the plug 19 stem, so that, the rotational adjustment of said element having been had, the reel seat assembly may be completed by telescopic mounting of the ferrule 17 on the element butt end and insertion of the adhesively-coated plug 19 stem within the otherwise open bore end and to clamped engagement of its head against the ferrule flange 18 which in turn closes against the element 10 end.

When assembled in its mounted relation on a fishing rod handle section, the improved reel seat is available for use in an obvious and usual manner. It being desired to mount a conventional reel on the seat, the sleeve 16 is rotated for travel of said sleeve axially of the element 10 and toward the grip 20 until the groove or channel 11 is wholly exposed at that end of the assembly. Thereafter, one end of the reel base 12 is seated in the groove or channel and slipped therealong into the pocket formed for its reception under the overhang of the ferrule 17, the other end of the reel base is seated in the groove or channel portion at the threaded end of the assembly, and the sleeve 16 is rotated to effect travel thereof toward the reel and into overlapping engagement of the sleeve with the adjacent reel base end, thereby securely clamping the reel to the seat and holding it against displacement therefrom than by remanipulation of the sleeve. While the bonding characteristics of adhesives available for interconnection of wood, plastics and synthetic resins are adequate to retain the elements of the assembly against normal impacts and strains, it is to be noted that the provision of the rib or segment 14 operates to protect the ferrule 17 and head of the plug 19 against shocks transmitted through the reel base 12 in a direction which might tend to unseat and dislodge the plug, and the shouldered termination of the groove or channel 11 near the threaded end of the assembly similarly provides an abutment disposed to absorb end shocks transmitted through the reel base without deformation of or damage to the reel seat assembly. The full-circular character of the ferrule and sleeve elements operable to retain the reel base against influences acting radially of the assembly provides a strength and mounted security not dependent upon attaching means, such as pins, rivets, and the like, and brings into play the full strength and resistance of the element 10 walls to function as a rugged and substantial reel support.

While the improvement has been shown and described in a mounting as a butt termination for a fly-casting rod, it is of course apparent that the assembly could, through the elimination of the plug 19, be mounted on the other side of a rod grip to receive and support a reel ahead of said grip in the direction of rod length in the manner typical of bait-casting rods; and such use of the pertinent elements of the improvement is within the contemplation of the invention.

Since many changes, variations, and modifications in the specific form, construction, and arrangement of the elements shown and described may be had without departing from the spirit of my invention, I wish to be understood as being limited solely by the scope of the appended claim, rather than by any details of the illustrative showing and foregoing description.

I claim as my invention:

As a reel seat adapted for adhesively-bonded assembly on and in operative relation with a fishing rod, a rigid, tubular body of non-metallic material unitarily molded with an axial bore opening through both of its ends for the telescopic reception of a fishing rod section end, with screw threads exteriorly about and for a considerable distance inwardly from one of its ends, with a smooth, cylindrical portion at its other end, and with a channel for the accommodation of a reel plate longitudinally of its exterior surface in a depth radially of the body exceeding the depth of the screw threads therein and in a length less than that of the body wholly confined between and in non-intersecting relation with the body ends and interrupting inner convolutions of said screw threads, a smoothly-cylindrical ferrule telescopically engageable over the body cylindrical end in overhanging relation with the adjacent body channel end, a radially-inward, annular end flange on said ferrule defining an aperture axially of the ferrule registrable with the body bore, said end flange constituting an abutment for the body end received within the ferrule, and a plug of non-metallic material unitarily molded with a cylindrical stem receivable within and to fill an end of the body bore and a coaxial, radially-expanded head clampably engageable with and exteriorly against the ferrule end flange when said stem is entered through the aperture thereof; together with an internally-threaded sleeve on and coacting with the body screw threads for adjustment longitudinally of the body into and out of covering relation with the thread-interrupting end of the body channel.

PHILIP W. PHILLIPSON.

REFERENCES CITED

The following references are of record in the file of this patent:

UNITED STATES PATENTS

| Number | Name | Date |
| --- | --- | --- |
| 270,460 | Mitchell | Jan. 9, 1883 |
| 1,271,073 | Patten | July 2, 1918 |
| 1,350,636 | Beaty | Aug. 24, 1920 |
| 2,104,495 | O'Brien | Jan. 4, 1938 |
| 2,127,163 | Davis | Aug. 16, 1938 |
| 2,145,612 | Scogland et al. | Jan. 31, 1939 |